United States Patent
Yamamoto et al.

[11] Patent Number: 5,280,160
[45] Date of Patent: Jan. 18, 1994

[54] RECORDING AND REPRODUCING METHOD AND APPARATUS COMPENSATING FOR PREDICTED DEVIATION BASED ON DETECTED RELATIVE SKEWING OF RECORDING MEDIUM

[75] Inventors: Masakuni Yamamoto, Yokohama; Masahisa Fujino, Musashino, both of Japan

[73] Assignee: Canon Kabushiki Kaisha, Tokyo, Japan

[21] Appl. No.: 74,010

[22] Filed: Jun. 9, 1993

Related U.S. Application Data

[63] Continuation of Ser. No. 657,951, Feb. 21, 1991, abandoned, which is a continuation of Ser. No. 159,546, Feb. 22, 1988, abandoned.

[30] Foreign Application Priority Data

Feb. 27, 1987 [JP] Japan ............................ 62-043128
Nov. 10, 1987 [JP] Japan ............................ 62-282024

[51] Int. Cl.$^5$ .......................... G06K 7/10; G11B 7/09
[52] U.S. Cl. ................................. 235/454; 235/476; 369/44.26
[58] Field of Search ............... 235/454, 456, 436, 437, 235/470, 476, 484, 487; 369/44.11, 44.26, 44.27, 43, 47, 50, 54, 58

[56] References Cited

U.S. PATENT DOCUMENTS

| | | | |
|---|---|---|---|
| 4,213,040 | 7/1980 | Gokey et al. | 235/454 |
| 4,588,882 | 5/1986 | Buxton | 235/487 |
| 4,634,850 | 1/1987 | Pierce et al. | 235/487 |
| 4,652,730 | 3/1987 | Marshall | 235/456 |
| 4,692,603 | 9/1987 | Brass et al. | 235/454 |
| 4,695,991 | 9/1987 | Hudson | 369/46 |
| 4,774,400 | 9/1988 | Kimura | 235/454 |
| 4,777,356 | 10/1988 | Toyota et al. | 235/454 |
| 4,786,792 | 11/1988 | Pierce et al. | 235/456 |
| 4,855,981 | 8/1989 | Kimura et al. | 235/456 |
| 4,860,275 | 8/1989 | Kakinuma et al. | 235/456 |

FOREIGN PATENT DOCUMENTS

63-20766 1/1988 Japan .

*Primary Examiner*—Robert A. Weinhardt
*Attorney, Agent, or Firm*—Fitzpatrick, Cella, Harper & Scinto

[57] ABSTRACT

In a method or apparatus for reading information from each of a plurality of information tracks arranged in a longitudinal direction on an information recording medium by relatively moving the information recording medium the orthogonally to the longitudinal direction of the tracks relative to a sensor array for reading information from the information tracks, wherein relative skew between the direction of arrangement of sensors of the sensor array and the longitudinal direction of the track is detected, and information is read from the information tracks while the recording medium and the sensor array are relatively moved in the longitudinal direction of the information tracks and, if desired, while the sensor array and the recording medium are relatively moved in such a manner as to compensate for deviation of an information reading area of an information track from a proper position caused by the skew in the course of the relative movement, based on the result of the detection.

17 Claims, 8 Drawing Sheets

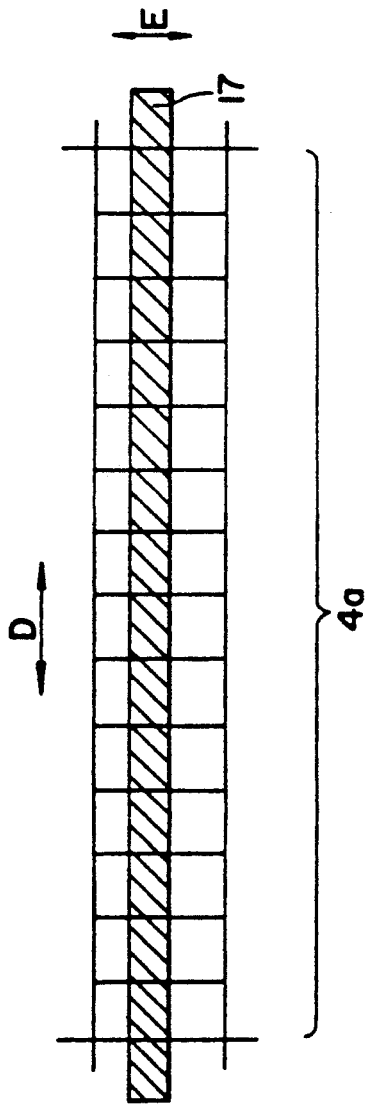
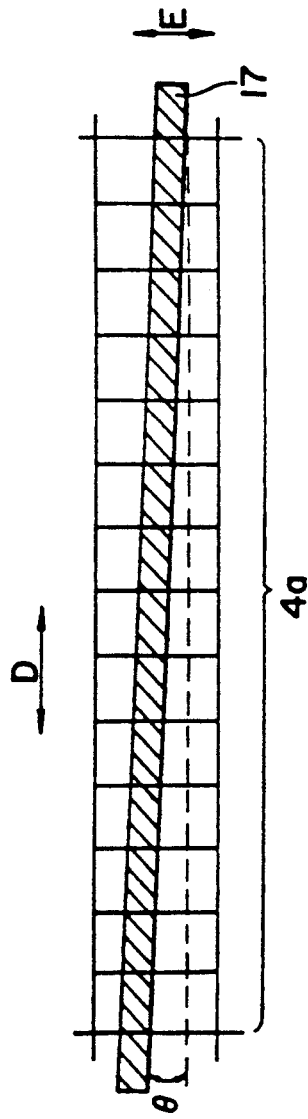

RECORDING AND REPRODUCING METHOD AND APPARATUS COMPENSATING FOR PREDICTED DEVIATION BASED ON DETECTED RELATIVE SKEWING OF RECORDING MEDIUM

This application is a continuation of prior application, Ser. No. 07/657,951 filed Feb. 21, 1991, which application is a continuation of prior application, Ser. No. 07/159,546 filed Feb. 22, 1988, both now abandoned.

BACKGROUND OF THE INVENTION

The present invention relates to a method for controlling relative movement between a recording medium and a sensor array when information is sequentially read by moving the sensor array relative to the information recording medium. More particularly, the present invention relates to a method for controlling a recording medium and a reproducing head when an information track of an information recording medium is optically focused onto a sensor array and a bit pattern linearly recorded on the information track is read.

Recently, many types of optical recording and reproducing apparatus which use information recording media, such as optical files or compact disks have been proposed. A card-like optical information recording medium (optical card) which is easier to carry than such information recording media, and which has a large capacity relative to its size, has also been proposed.

FIG. 1(a) shows a schematic plan view of a record format of the optical card, and FIG. 1(b) shows a partial enlarged view of the record format.

In FIGS. 1(a) and 1(b), a record area 2 is provided on an optical card 1 which is the information recording medium. The record area 2 has a plurality of bands 3 arranged thereon. Each of the bands 3 has a plurality of tracks 4 arranged thereon, and each of the tracks 4 comprises information tracks 4a having an information capacity of several tens to one hundred bits, and a portion of a reference line (R line) 5 which delimits the bands 3. An arrow A indicates a direction of movement of the optical card 1 in a reproduction mode, and an arrow C indicates a direction of scan for reading information by the optical head in the reproduction mode.

FIG. 2 shows a diagram of the optical card reproducing apparatus, and FIG. 3 illustrates an operation of the reading head.

In FIGS. 2 and 3, the optical card 1 is movable in the direction A by a rotation mechanism 6. The information recorded on the optical card 1 is read and reproduced by the optical head 11 for each of the tracks 4. A light from a light source 7, such as an LED, is focused by an illuminating optical system 8 and irradiated as a spot onto the track 4 on which information has been recorded. The image on the track 4 is focused onto a sensor array 10 by a focusing optical system 9 so that an electrical signal representing the information recorded on the track 4 is produced by the sensor array 10. After the reading of the track 4, the optical card 1 is moved in the direction A and the optical head 11 is moved in the direction C so that the information on the next track is read in a similar manner.

FIGS. 4(a) and 4(b) show reading areas on the optical card by the sensor array.

In FIG. 4(a), the direction of arrangement of information on the information track 4a of the optical card 1 and the longitudinal direction of the read area 17 by the sensor array 10 are parallel, and in FIG. 4(b), the direction of arrangement of information and the longitudinal direction of the read area 17 are not parallel.

Usually, when the optical card 1 is to be loaded to the optical card reproducing apparatus, the direction of arrangement of the tracks (arrow E) of the information tracks 4a and the direction of movement of the optical card 1 (arrow A in FIG. 2) are not parallel, because of positional deviation when the optical card is loaded or abrasion of the optical card 1. Namely, as shown in FIG. 4(b), the longitudinal direction of the read area 17 of the sensor array 10 and the direction of arrangement of the information track 4a (arrow D) are not parallel but have an angle $\theta$ therebetween. As a result, when the optical card 1 is moved in the direction A in the reproduction mode, the information track 4a deviates from the illumination spot irradiated to read information from the track, in the direction C. If the angle $\theta$ is relatively large, the information track 4a moves off the illumination spot and information cannot be reproduced.

SUMMARY OF THE INVENTION

It is an object of the present invention to solve the problems encountered in the prior art apparatus and to provide a method for controlling relative movement between a recording medium and a sensor array when information is to be read from an optical card, by properly controlling relative displacement between the sensor array and an information array even when a direction of arrangement of information tracks and a direction of a read area of the sensor array are not parallel so that information reading accuracy is improved.

Other objects of the present invention will be apparent from the description of preferred embodiments of the present invention.

BRIEF DESCRIPTION OF THE DRAWINGS

FIG. 4(a) and 4(b) illustrate reading of an information track by a sensor array.

FIGS. 8(a) and 8(b) show an embodiment of a method of controlling relative movement between a recording medium and a CCD array in accordance with the present invention, in which FIG. 8(a) shows a block diagram and FIG. 8(b) shows a flow chart of a method for reproducing information, including a method for controlling in the present embodiment.

DETAILED DESCRIPTION OF THE PREFERRED EMBODIMENTS

When an information recording medium is loaded to a reader, an information track of the recording medium and a sensor array may not be parallel, as described above. If the information recording medium is moved relative to the sensor array under such a condition, a position on the sensor array which corresponds to a predetermined read area varies.

In one embodiment of the present invention, skew between a longitudinal direction of the information track (or a direction of arrangement of information) and a longitudinal direction of the read area of the sensor array (or a direction of arrangement of the sensor) is predetected based on distance of relative movement of the sensor array and the recording medium and distance of movement of a predetermined area in the track. Based on the detected skew, deviation in the relative movement of the information recording medium and the sensor array is predicted, and the sensor array and/or the recording medium is moved in a direction to compensate for the deviation.

The embodiment of the present invention is now explained with reference to the drawings.

Figure 1A:
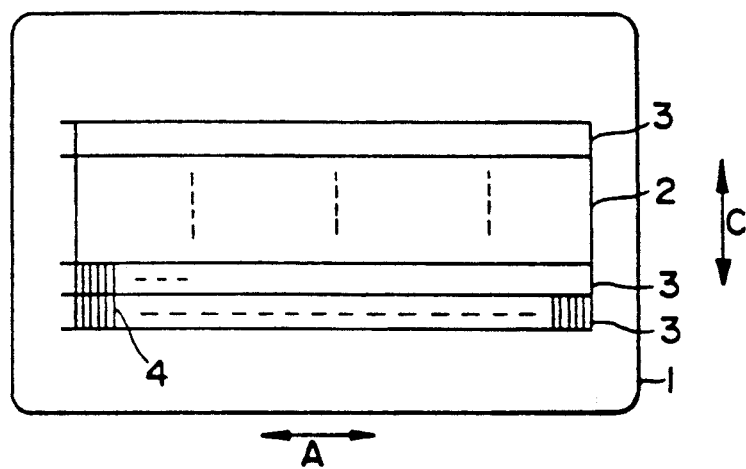
FIG. 1(a) is a schematic plan view of a recording format of an optical card.
Figure 1B:
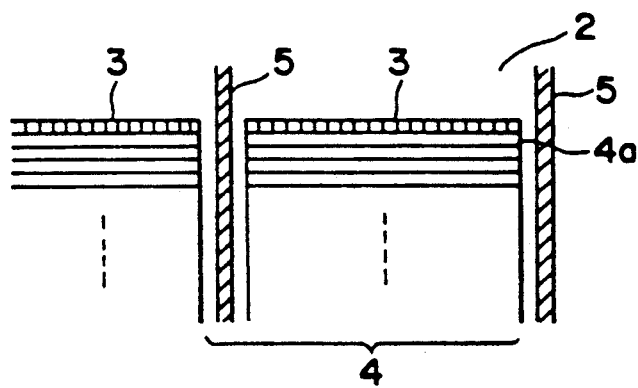
FIG. 1(b) is a partial enlarged view of the record format shown in FIG. 1(a).
Figure 6:
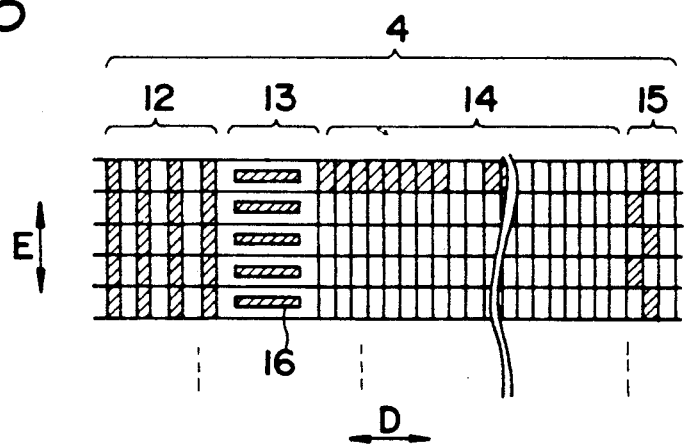
FIG. 6 shows a schematic enlarged view of a recording format of one embodiment of the optical card of the present invention.

FIG. 6 shows a schematic enlarged view of a recording format of one embodiment of an optical card used in the present invention. The format of the overall optical card is the same as that shown in FIG. 1 and the like elements are designated by like numerals.

The track 4 comprises a preamble area 12 for synchronizing a clock of a circuit, an identification area 13 for separating and identifying one track from adjacent tracks in the direction of arrangement of tracks (arrow E) and indicating the beginning of the information track, an information track 14 having information recorded thereon, and an end bit area 15 for separating and identifying one track from adjacent tracks in the direction E and indicating the end of the information track 14. An area including the identification area 13 connected in the direction shown by double-head arrow E constitutes the R (reference) line 5. The identification area 13 includes a rectangular record area 16 (hatched area) which is detected by the sensor array 10.

Figure 2:
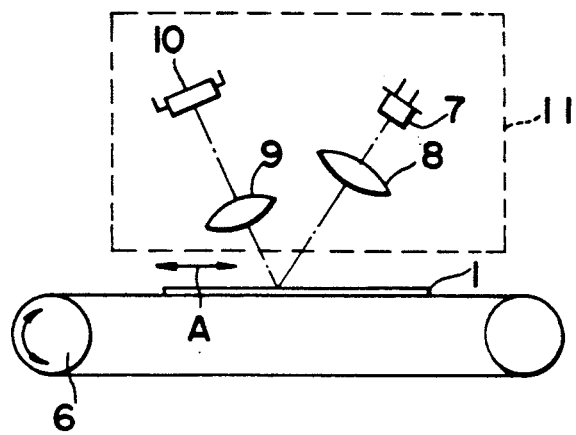
FIG. 2 shows a diagram of an optical card reproducing apparatus.

A method for detecting skew between the longitudinal direction of the sensor array and the direction of arrangement of information of the information track when information on the optical card is read by the optical card reproducing apparatus shown in FIG. 2, is now explained.

Figure 5:
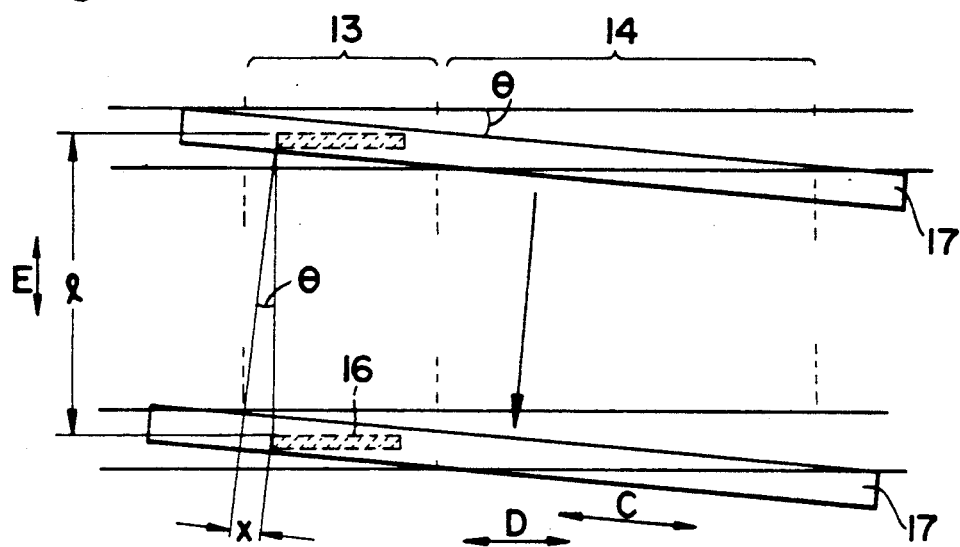
FIG. 5 illustrates a method for detecting inclination.

FIG. 5 illustrates the tilt detection method of the present embodiment.

Figure 7:
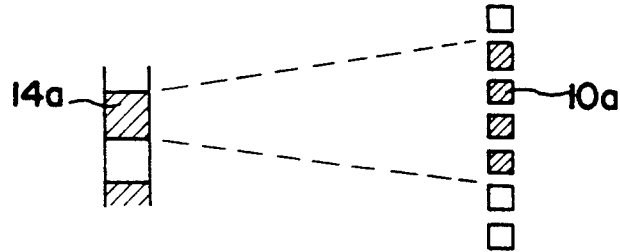
FIG. 7 shows a relationship between the sensor cell and the bits on the information track.

It is assumed that the optical card 1 is loaded to the optical card reproducing apparatus with a skew angle of $\theta$ so that the longitudinal direction of the read area 17 of the sensor array and the direction of arrangement of information on the information track of the optical disk (direction D) make an angle $\theta$ therebetween. As shown in FIG. 2, the optical card 1 is moved in the direction A by the rotation mechanism 6 and the read operation is started. When one band of information has been read, a position of the record area 16 in the identification area 13 is moved by a distance x on the read area 17. On the sensor array 10, as shown in FIG. 7, a light image is projected with a magnification factor of M so that one bit 14a on the information track 14 of the optical card 1 corresponds to a plurality of sensor cells 10a of the sensor array 10. Accordingly, displacement of the record area 16 on the sensor array is equal to $x' = Mx$.

The angle $\theta$ between the longitudinal direction of the read area of the sensor array and the direction of arrangement of information on the information track is given by $$\theta = \sin^{-1}\left(\frac{\frac{x'}{M}}{l}\right) \quad (1)$$

where l is a length of the band (FIG. 5). Since the magnification factor M and the length l of the band are preset, the angle $\theta$ is determined by detecting the displacement $x'$ of the record area 16 on the sensor array 10.

The displacement $x'$ may be detected by using a start pulse and a drive pulse of the sensor array 10. The number of drive pulses generated from the start pulse to the detection of the record area 16 by the sensor array 10 is counted so that the displacement $x'$ of the record area 16 on the sensor array 10 is detected as a difference of counts of the drive pulses.

In the present embodiment, the R line is preferably used as the predetermined area in the track, although a tilt detection area may be provided in the track. When the R line in the track is used as the predetermined area in the track, the R line is provided for each track so that the tilt may be detected at any position in one band.

A method for controlling the optical head by using the skew angle $\theta$ between the longitudinal direction of the read area 17 of the sensor array and the direction of arrangement of information on the information track (direction D) is now explained with reference to FIG. 8(a) and a flow chart of FIG. 8(b).

Figure 8:
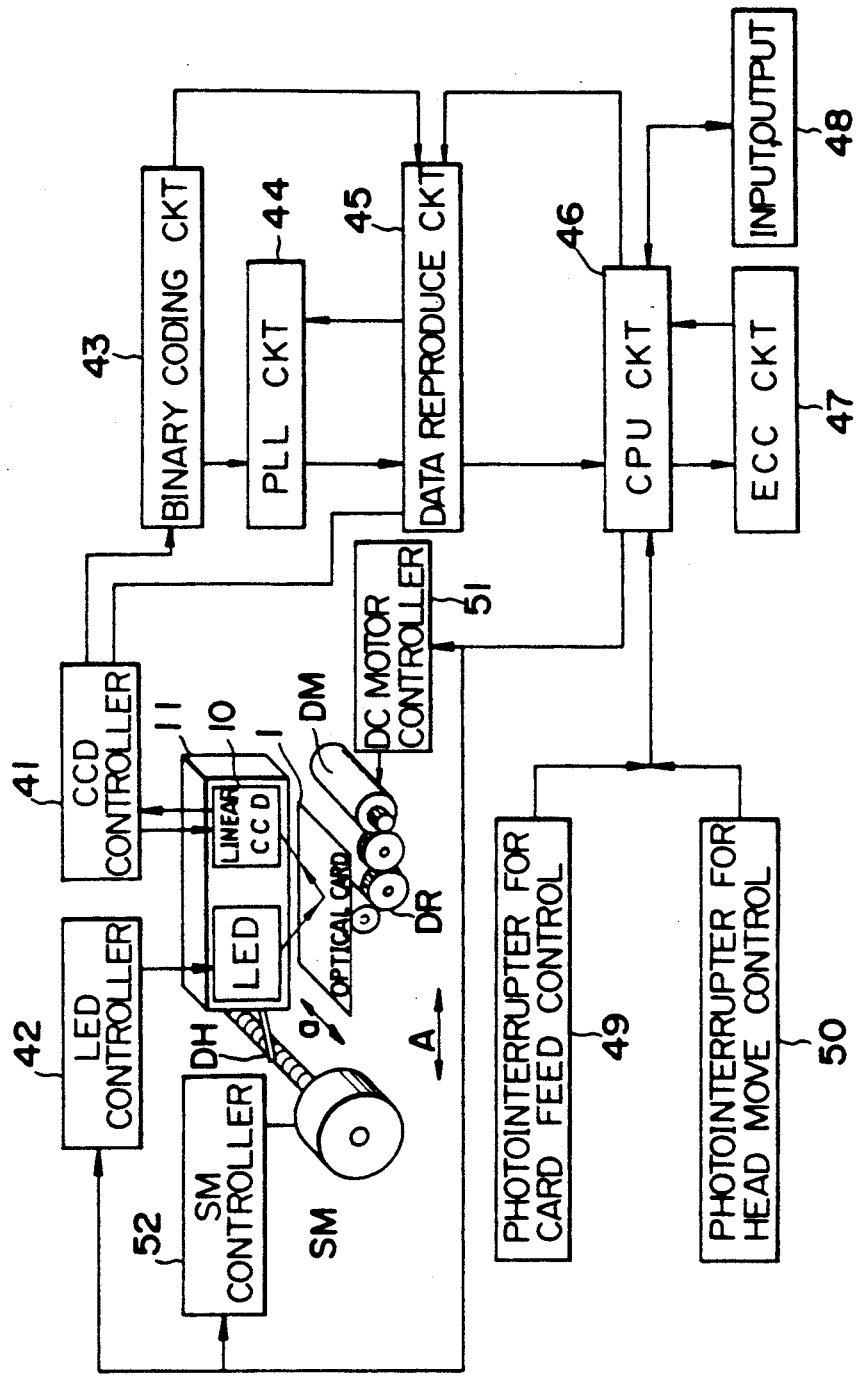
Figure 8:
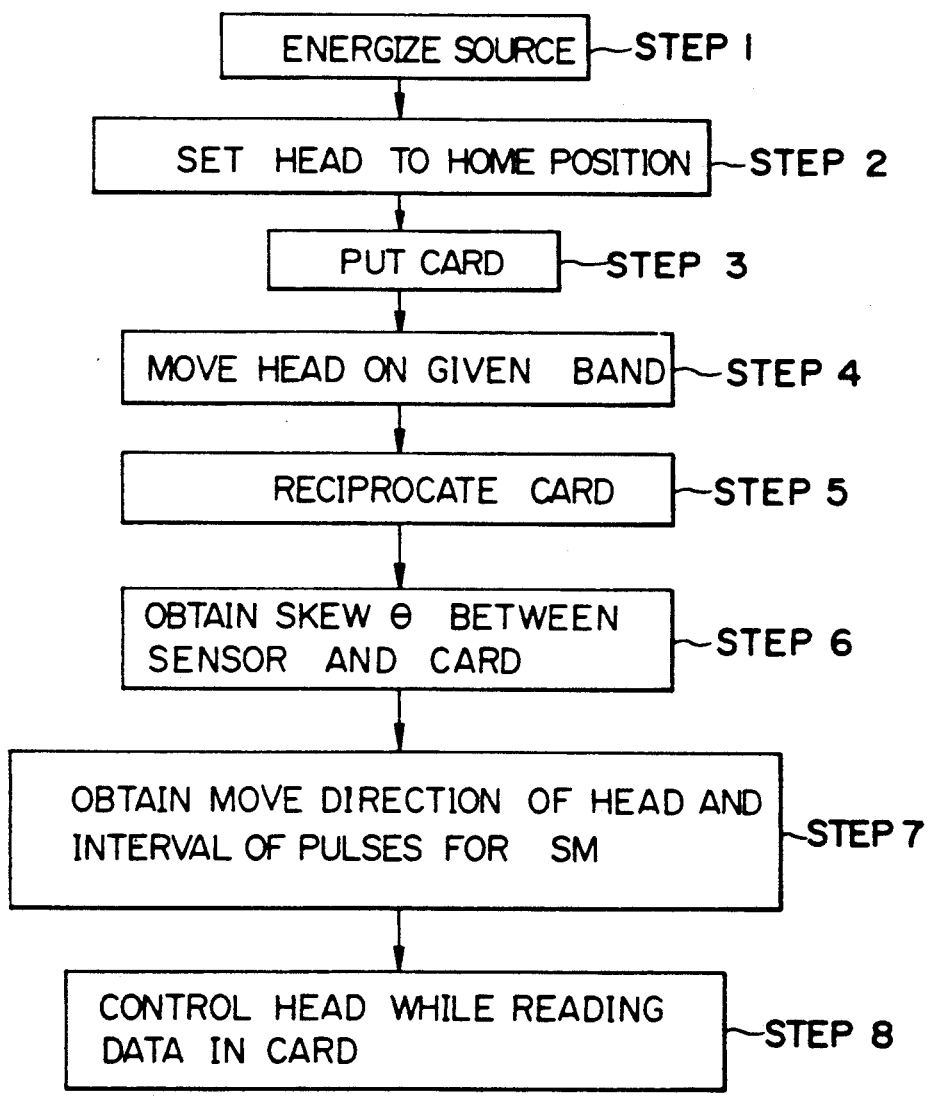

FIGS. 8(a) and 8(b) show one embodiment of the method for controlling relative movement of the recording medium and the sensor array in accordance with the present invention. FIG. 8(a) shows a block diagram and FIG. 8(b) shows a flow chart of the method for reproducing information including the control method of the present embodiment.

In FIG. 8(a), numeral 11 denotes an optical head which contains a CCD array which is the read sensor, an illumination LED, an illumination optical system and a focusing optical system. Numeral 1 denotes an optical card.

SM denotes a stepping motor for applying power to a drive mechanism DH for moving the optical head 11, and DM denotes a DC motor for applying power to a drive mechanism DR which moves the optical card 1. They are controlled by a stepping motor controller 52 and a DC motor controller 51, respectively.

The DC motor controller 51 and the stepping motor controller 52 are activated by signals from a CPU 46 which controls the overall optical card reproducing apparatus.

On the other hand, the CCD array 10 of the optical head 11 is controlled by the CCD controller 41, and the LED is controlled by an LED controller 42. The LED controller 42 receives a control signal directly from the CPU, and the CCD controller 41 receives a control signal through a data reproduction circuit 45.

Numeral 43 denotes a binarization circuit for binarizing a signal read by the CCD array 10. The binary signal from the binarization circuit 43 is applied to a PLL circuit 44 for generating a data reproduction clock and a data reproduction circuit 45 which reproduces data. Numeral 47 denotes an ECC circuit for correcting error of the data. The data reproduced by the data reproduction circuit 45 is read by the CPU 46 and error in the data is corrected to produce correct reproduced data.

Numeral 48 denotes an input/output port through which the reproduced data having error corrected by the ECC circuit is sent to output equipment, such as a display and a printer. The input/output port 48 is also used to input a command by a holder of the optical card 1 or a user of the reproduction apparatus to reproduce the information on the optical disk 1.

Numeral 49 denotes a photo-interrupter for controlling card feed, provided in the reproduction apparatus to control a drive mechanism DM for the optical card 1.

Numeral 50 denotes a photo-interrupter for controlling head drive to control a drive mechanism DH for the optical head 11. It is directly coupled to the CPU.

FIG. 8(b) shows a flow chart when information is reproduced from the optical card 1 in accordance with the reproduction method of the present control method. The information is reproduced through steps 1 to 8.

The control method of the present embodiment is explained with reference to FIGS. 8(a) and 8(b).

When the optical card reader shown in FIG. 8(a) is powered on, the CPU 45 which controls the overall apparatus is turned on (step 1 in FIG. 8(b)).

The stepping motor controller 52 is activated by a signal from the CPU 45 and the optical head 11 is moved by the drive mechanism DH in accordance with the signal from the controller 52. The optical head 11 is positioned to a predetermined home position and stands by there (step 2 of FIG. 8(b)).

The optical card 1 is now loaded to the reader (step 3 of FIG. 8(b)) and the optical head 11 is moved to the predetermined band 3 of the optical card 1 by the drive mechanism DH (step 4 of FIG. 8(b)).

The optical card 1 is reciprocally moved in the direction A in accordance with a predetermined command or automatically (step 5 of FIG. 8(b)).

As the optical card 1 starts the reciprocal movement, the optical head 11 relatively moves on the band 3 of the optical card 1. A skew angle $\theta$ between the CCD array 10 and the optical card 1 is determined based on a displacement of a predetermined area in the information track in the band 3, on the CCD array 10 due to the relative movement (step 6 of FIG. 8(b)).

Based on the skew angle $\theta$, the direction of movement of the optical head 11 in the reciprocal movement and the interval of the control pulses for the stepping motor SM are determined in a manner described later (step 7 of FIG. 8(b)).

When the R line 5 (or identification area 13) is used as the predetermined area, the optical head 11 is moved so as to bring the read area 17 of the CCD 10 for the R line 5 toward the center of the CCD array 10 from a position where information is actually read from the information track 14, so that the identification area 13 is focused on the sensor array 10 in whichever direction the R line 5 is moved along the arrow C. The skew angle $\theta$ between the longitudinal direction 17 of the read area of the CCD array 10 and the direction of arrangement of information on the information track 14 (direction D) is detected in the above method, preferably in one to several reciprocal movements of the optical card 1 in the direction A.

The pulse motor is driven by one pulse for each displacement $Y/\sin\theta$ of the optical card 1 in the direction A, where Y is the displacement of the optical head driving pulse motor PM by one pulse, to return the CCD array 10 by Y in the direction C to control the optical head so that the predetermined position in the read area of the CCD array 10 is returned to the R line 5 (step 8 of FIG. 8(b)).

The optical head 11 is driven to the specified band so that the R line 5 in the leading track of this band 3 is positioned at a predetermined position in a predetermined range on the CCD array 10.

$$\frac{Y}{\sin\theta} / v - t$$

time after the start of movement of the optical card, the optical head 11 is driven by one pulse, where t is a response speed of the pulse motor PM and v is a velocity of the optical card 1 in the direction A, and the optical head 11 is there-after driven by one pulse for each $$\frac{Y}{\sin\theta} / v$$

time until the last track of the band 3 is reached.

Such a control is usually effected for each band 3, but the skew angle $\theta$ may be detected only for the band 3 at the start of reading if the skew angle between the longitudinal direction of the read area of the CCD array 10 and the direction of arrangement of information on the information track is created primarily when the optical card 1 is loaded. If the skew angle $\theta$ is created after the start of reading by external shock or the like, the skew angle is again detected to control the optical head 11.

The relative movement of the optical card 1 and the optical head 11 when the skew angle $\theta$ is to be detected may be unidirectional, or several skew angles $\theta$ may be detected in reciprocal movement and a mean angle thereof may be used.

A second embodiment of the present invention is now explained with reference to the drawings.

Figure 9:
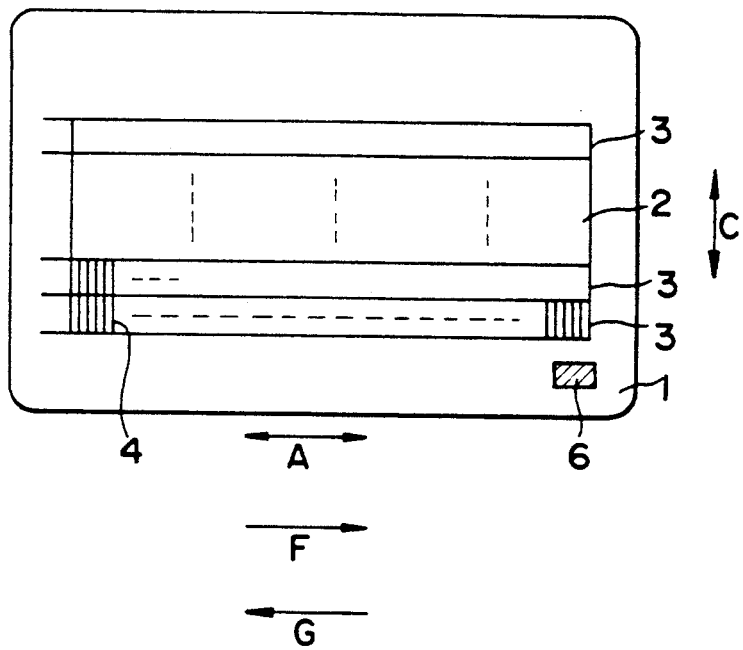
FIG. 9 shows a schematic plan view of a recording format of an optical card in a second embodiment of the method for recording and reproducing information in accordance with the present invention.

FIG. 9 shows a schematic plan view of a recording format of an optical card in one embodiment of the information recording and reproducing method of the present invention.

The optical card 1 has a record area 2 thereon. A plurality of bands 3 are arranged on the record area 2 and each of the bands 3 has a plurality of information tracks 4 arranged thereon.

In the optical card of the present embodiment, an initial position 6, at which the optical head is initially set, is provided at an end of the band 3. When the optical head 11 is relatively moved in a direction shown by arrow G, the skew angle is detected, and the information is read when the optical head 11 is relatively moved in the direction shown by arrow F.

Figure 3:
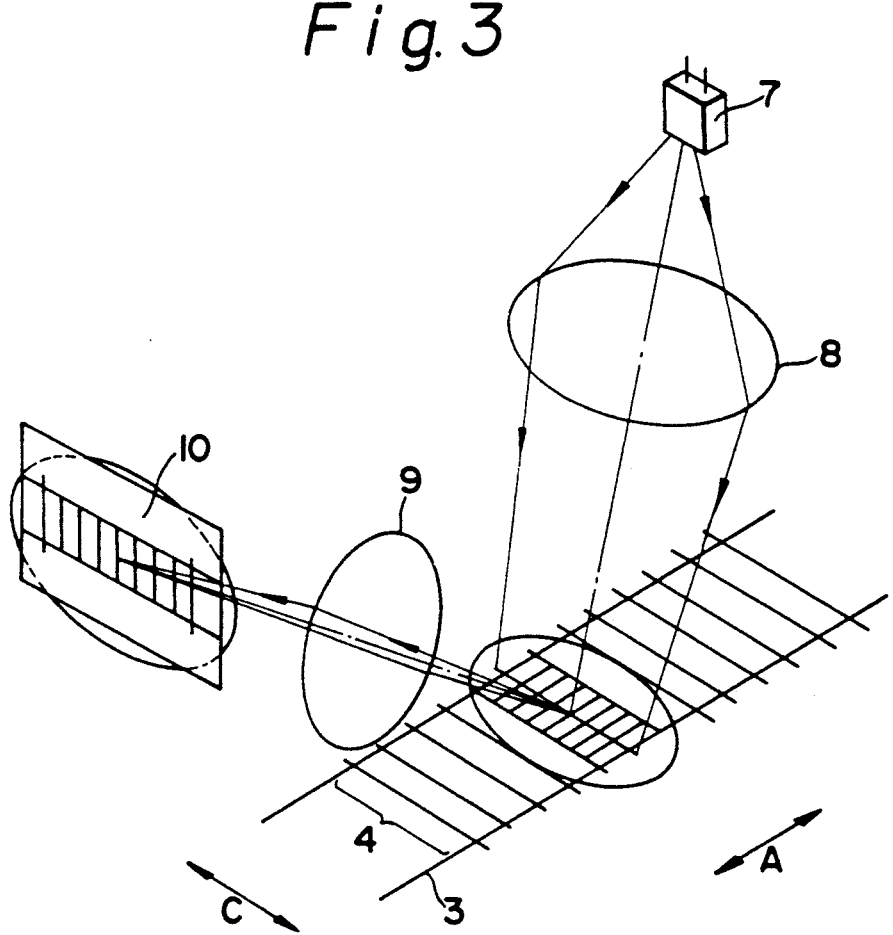
FIG. 3 illustrates an operation of a reading head.

When the optical card 1 is loaded to the reproduction apparatus shown in FIGS. 2 and 3, the optical head 11 stands by at the initial position 6 of the optical card 1.

Then, as the reciprocal movement in the direction A is started by the rotation mechanism 6, the optical head 11 is driven to the last track of the specified band. The optical head 11 is controlled such that the R line is positioned at the center of the sensor array 10.

The optical head 11 is relatively moved in the direction G and the skew angle between the track 4 and the sensor array 10 is detected in a manner to be described later.

When a leading track 4 of the band 3 is reached, the rotation mechanism 6 is reversed and the optical head 11 is relatively moved in the direction F to read the information. The optical head 11 is controlled such that the R line is within a predetermined range on the sensor array 10 and the detected tilt angle is compensated for.

In the present embodiment, the skew is detected when the optical head 11 is relatively moved in the direction G, and the information is read while the detected skew is compensated for, when the optical head 11 is relatively moved in the opposite direction F.

Accordingly, the overall information read time can be significantly reduced. Further, since the skew is predetected and the information is read while the skew is compensated for, the information can be correctly reproduced.

The method for detecting and compensating for the skew is more specifically explained.

Figure 10:
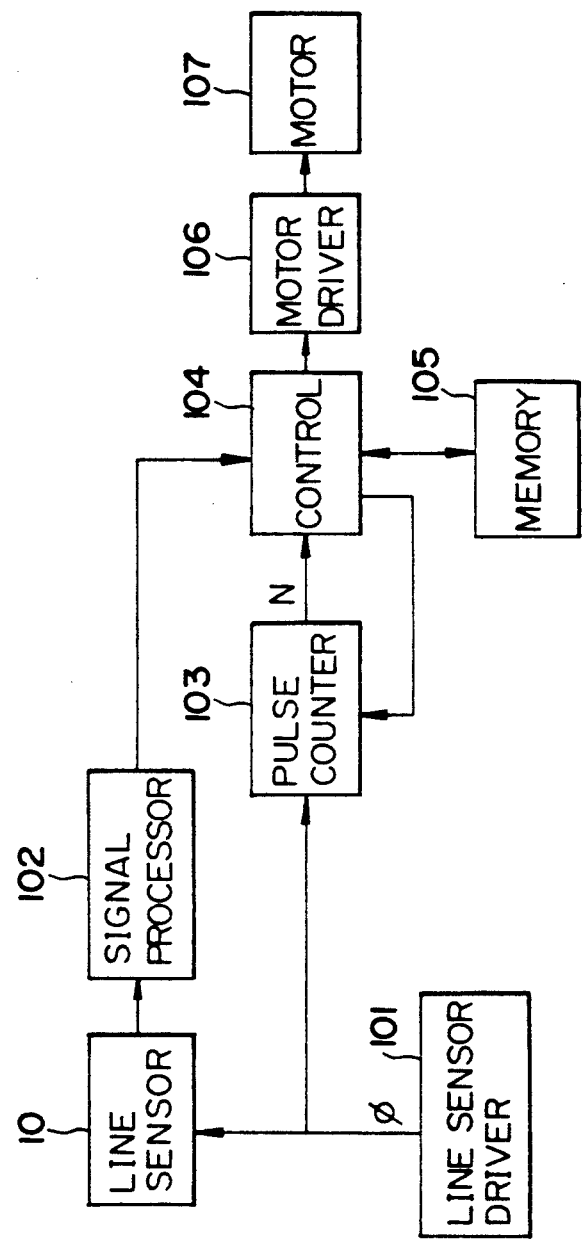
FIG. 10 shows a diagram of a skew detection and correction circuit in the second embodiment.

FIG. 10 shows a diagram of a skew detection and compensation circuit.

The sensor array 10 scans and reads the information in response to a start pulse and a drive pulse $\phi$ from a drive circuit 101. The pulse $\phi$ is also applied to a pulse counter 103.

The pulse counter 103 starts to count in response to the start pulse and stops count in response to a stop signal from a controller 104. The count N of the pulse counter 103 is supplied to the controller 104.

An output signal from the sensor array 10 is applied to the controller 104 through a signal processor 102 which binarizes the signal. When the controller 104 detects the record area 16 of the identification area 13 from the input signal, it supplies the stop signal to the pulse counter 103. The controller 104 has a memory 105.

The skew is detected by the above arrangement. When the read area 17 of the sensor array 10 is on the last track, the start pulse is generated and the sensor array 10 starts to scan and read the information, and the pulse counter 103 starts to count the drive pulse $\phi$.

When the controller 104 detects the record area 16, the pulse counter 103 stops by the stop signal, and the current count $N_1$ is supplied to the controller 104, which stores the count $N_1$ into the memory 105.

When the leading track is reached, the same operation is carried out and the current count $N_2$ is supplied to the controller 104.

The controller 104 calculates a difference ($N_1-N_2$) between the count $N_1$ for the last track and the count $N_2$ for the leading track, and multiplies it by a cell size of the sensor array 10 to detect the displacement x'. Since the displacement x' is the difference between the counts, the direction of skew may be determined by the polarity of the difference. Based on the displacement x', the controller 104 calculates the skew angle $\theta$.

In this manner, the skew is detected by the relative movement of the optical head 1 in the direction G.

Then, the optical head 11 is relatively moved in the direction F and the information is read while the detected tilt is compensated. In order to always maintain the R line at the given position of the read area 17 when the optical head 11 is relatively moved in the direction F, it is necessary to the optical head 11 in the direction C at a rate determined by the skew angle $\theta$.

The skew compensation is effected by a pulse motor 107 driven by a motor driver 106 in accordance with the control signal from the controller 104.

For example, the pulse motor 107 may be rotated by one pulse in the direction determined by the polarity of the skew angle $\theta$ each time the optical head 11 is relatively moved by $dF=Y/\sin|\theta|$ in the direction F, where Y is a displacement of the optical head 11 when one pulse is applied to the pulse motor 107.

Further, one pulse is supplied to the pulse motor 107 a (dF/v−t) time after the start of reproduction of the leading track, where t is a response time of the pulse motor 107 and v is a velocity of relative movement of the optical head 11 in the direction F. Thereafter, one pulse is supplied for each dF/v time until the last track is reached.

By controlling the optical head 11 in this manner, the R line can always be maintained at the given position in the read area 17 so that the information is read in a stable manner.

For a simple and inexpensive card feed mechanism, it is necessary to detect the skew each time the band 3 is shifted. In the present embodiment, even in such a case, the skew is detected while the optical head is moved from the end track to the leading track, and the information from the end track to the leading track is detected while the skew is compensated. Accordingly, there is no time loss due to the detection for each band and the high speed reproduction is attained.

The distance of relative movement when the skew angle $\theta$ between the optical card 1 and the optical head 11 is detected may be a distance through which the CCD array 10 can read the band 3 from one end to the other end, or a distance to an intermediate point of the band 3. The angle 8 may be determined by any method other than that of the present embodiment as long as the skew angle 8 between the optical card 1 and the optical head 11 is detected with a predetermined precision.

In the above embodiments, the optical card is moved when the skew is detected and the information is read, although the optical head may be moved instead. While the sensor array is moved in the direction to compensate for the deviation in the above embodiments, the optical card may be moved in the direction to compensate for the deviation.

What is claimed is:

1. A method for reading information, from each of a plurality of information tracks arranged in an arrangement direction on an information recording medium, the information being arranged on the information tracks in a direction substantially orthogonal to the direction of arrangement of the information tracks, by moving the recording medium relative to detecting means generally in the direction of arrangement of the information tracks for reading information from the information tracks, said method comprising the steps of:

detecting relative skew between a direction of reading of information by the detecting means and the direction of arrangement of the information tracks;

predicting deviation of an information track to be generated from an information reading area, the deviation corresponding to relative skew caused when relative movement generally along the direction of arrangement of the information tracks is effected between the detecting means and the recording medium for reading information, said predicting step being based on the result of the relative skew detected in said detecting step;

reading information from information tracks, said reading step being performed during the relative movement between the detecting means and the recording medium generally along the direction of arrangement of the information tracks for reading information; and relatively moving the information recording medium and the detecting means in a direction to compensate for the deviation predicted in said predicting step, during said reading step.

2. A method for reading information according to claim 1, wherein said step of relatively moving the recording medium and the detecting means to compensate for predicted deviation comprises moving the detecting means in the direction to compensate for the predicted deviation.

3. A method for reading information according to claim 2, wherein said detecting step comprises relatively moving the information recording medium and the detecting means generally int he direction of arrangement of the information tracks prior to the step of reading information from the information tracks.

4. A method for reading information according to claim 3, wherein the detecting means comprises a sensor array and said detecting step comprises reading a predetermined area in each of the tracks by the sensor array during the relative movement between the recording medium and the detecting means generally in the direction of arrangement of the information tracks prior to the step of reading information from the information tracks and by detecting displacement of the reading position of the predetermined area on the sensor array.

5. A method for reading information, from each of a plurality of information tracks arranged in an arrangement direction on an information recording medium, the information being arranged on the information tracks in a direction substantially orthogonal to the direction of arrangement of the information tracks, by moving the recording medium relative to detecting means for reading information rom the information tracks, said method comprising the steps of:

detecting relative skew between a direction of reading of information by the detecting means and the direction of arrangement of the information tracks by relatively moving the detecting means and the information recording medium generally in the direction of arrangement of the information tracks; and reading information from each of the information tracks by relatively moving the detecting means and the information recording medium in a direction opposite to the direction of relative movement during said detecting step and while relatively moving the detecting means and the information recording medium in a direction to compensate for deviation of an information track to be generated from information reading area corresponding to the skew detected in said detecting step.

6. An apparatus for reading information, from a plurality of information recording tracks arranged in an arrangement direction on an information recording medium, the information being arranged on the information tracks in a direction substantially orthogonal to the direction of arrangement of the information tracks, by moving the recording medium relative to detecting means generally in the direction of arrangement of the information tracks for reading information from the information tracks, said apparatus comprising:

skew detecting means for detecting relative skew between a direction of reading information by the detecting means and the direction of arrangement of the information tracks;

drive means comprising means for relatively moving the detecting means and the information recording medium; and control means for controlling said drive means, said control means comprising predicting means for predicting deviation of an information track to be generated from an information reading area corresponding to the skew detected by said skew detecting means when reading information from an information track, and compensating means for controlling said drive means to compensate for deviation predicted by said predicting means, while moving the recording medium relative to the detecting means to read information.

7. An apparatus for reading information according to claim 6, wherein said drive means further comprises means for driving the detecting means.

8. An apparatus for reading information according to claim 7, wherein the detecting means comprises a sensor array and said skew detecting means comprises means for detecting the skew by reading a predetermined area of each of the information tracks by said sensor array during relative movement generally in the direction of arrangement of the information tracks, and means for detecting displacement of a reading position of the predetermined area on the sensor array.

9. An apparatus for reading information, from a plurality of information tracks arranged in an arrangement direction on an information recording medium, the information being arranged on the information tracks in a direction substantially orthogonal to the direction of arrangement of the information tracks, by moving the recording medium relative to detecting means generally in the direction of arrangement of the information tracks for reading information from the information tracks, said apparatus comprising:

drive means comprising means for relatively moving the detecting means and the information recording medium; and control means for controlling said drive means, said control means comprising (i) means for detecting the deviation of the an information track to be generated from an information reading area, the deviation corresponding to relative skew between a direction of reading of the information by the detecting means and a direction of arrangement of the information tracks, and (ii) compensating means for compensating for the deviation caused when performing the relative movement generally in the direction of arrangement of the tracks for reading information, said compensating means effecting the compensation by controlling said drive means to relatively move the detecting means and the recording medium in a direction to compensate for the deviation.

10. An apparatus according to claim 9, wherein said control means further comprises means for detecting the relative skew between the direction of reading of information by said detecting means and the direction of arrangement of the information tracks and means for predicting the deviation from the relative skew and the relative movement generally in the direction of arrangement of the tracks.

11. An apparatus for reading information from a plurality of information recording tracks arranged in an arrangement direction on an information recording medium, the information being arranged on the information tracks in a direction substantially orthogonal to the direction of arrangement of the information tracks, said apparatus comprising:
- a sensor for reading information from the information recording tracks, said sensor comprising a readable area for reading information from an area of one of the information recording tracks corresponding to said readable area;
- a moving mechanism for relatively moving the information recording medium and said sensor, said moving mechanism effecting the relative movement to cause said sensor to successively read the information form each of the information recording tracks;
- a deviation predicting system for predicting relative deviation, between said readable area and an information recording track from which said sensor reads information, to be caused when said moving mechanism relatively moves the information recording medium and said sensor, said deviation predicting system predicting the relative deviation to be caused based on a difference between the direction of arrangement of the information tracks and the direction of the relative movement between the information recording medium and said sensor caused by said moving mechanism; and
- an actuator for relatively actuating the information recording medium and said sensor to compensate for the relative deviation predicted by said deviation predicting system, said actuator relatively actuating the information recording medium and said sensor in a direction opposite to a direction of the relative deviation, while reading information by said sensor.

12. An apparatus according to claim 11, wherein said deviation predicting system predicts the relative deviation on the basis of an output signal from said sensor when said moving mechanism relatively moves the information recording medium and said sensor.

13. An apparatus according to claim 11, wherein said deviation predicting system predicts the relative deviation, prior to reading of the information by said sensor, on the basis of an output signal from said sensor when said moving mechanism relatively moves the information recording medium and said sensor.

14. An apparatus according to claim 13, wherein said moving mechanism moves the information recording medium in a first direction and successively in a second direction opposite to the first direction, said deviation predicting system predicts the relative deviation on the basis of the output signal form said sensor which is generated during movement int he first direction, said sensor reads the information from the information recording tracks during movement in the second direction, and said actuator effects the relative actuation to compensate for movement in the second direction.

15. An apparatus according to claim 11, wherein said actuator actuates said sensor in a direction for reading information by said sensor.

16. An apparatus according to claim 13, wherein said sensor comprises a CCD array, and said actuator actuates said CCD array in a scanning direction for reading information.

17. An apparatus for reading information from a plurality of information recording tracks arranged in an arrangement direction on an information recording medium, the information being arranged on the information tracks in a direction substantially orthogonal to the direction of arrangement of the information tracks, said apparatus comprising:
- a sensor for reading information from the information recording tracks, said sensor comprising a readable area for reading information from an area of one of the information recording tracks corresponding to said readable area;
- a moving mechanism for relatively moving the information recording medium and said sensor, said moving mechanism effecting the relative movement to cause said sensor to successively read the information form each of the information recording tracks; and
- a deviation compensating system for compensating for relative deviation, between said readable area and the information recording track from which said sensor reads information, caused when said moving mechanism relatively moves the information recording medium and said sensor, said deviation compensating system compensating for the relative deviation based on a difference between the direction of arrangement of the information tracks and the direction of the relative movement between the information recording medium and said sensor caused by said moving mechanism, and said deviation compensating system effecting compensation by relatively actuating the information recording medium and said sensor in a direction opposite to a direction of the relative deviation, while reading information by said sensor.

* * * * *

UNITED STATES PATENT AND TRADEMARK OFFICE
CERTIFICATE OF CORRECTION

PATENT NO. : 5,280,160   Page 1 of 2
DATED : January 18, 1994
INVENTOR(S) : MASAKUNI YAMAMOTO ET AL.

It is certified that error appears in the above-indentified patent and that said Letters Patent is hereby corrected as shown below:

On the Title Page:

IN THE ABSTRACT:

Line 5, "the" (first occurrence) should be deleted.

COLUMN 1:

Line 25, "disks" should read --disks,--; and
Line 38, "4a" should read --4a,--.

COLUMN 2:

Line 30, "array" (first occurrence) should read --array,--;
Line 32, "parallel" should read --parallel,--; and
Line 41, "record" should read --recording--.

COLUMN 6:

Line 14, "$\frac{Y}{\sin \theta}/v - t$" should read

--At a $\frac{Y}{\sin \theta}/v - t$--.

UNITED STATES PATENT AND TRADEMARK OFFICE
CERTIFICATE OF CORRECTION

PATENT NO. : 5,280,160  
DATED : January 18, 1994  
INVENTOR(S) : MASAKUNI YAMAMOTO ET AL.

It is certified that error appears in the above-indentified patent and that said Letters Patent is hereby corrected as shown below:

COLUMN 7:

Line 67, "to" should read --to move--.

COLUMN 8:

Line 35, "angle 8" should read --angle $\theta$--; and  
    Line 37, "angle 8" should read --angle $\theta$--.

COLUMN 9:

Line 20, "int he" should read --in the--; and  
    Line 40, "rom" should read --from--.

COLUMN 12:

Line 4, "int he" should read --in the--; and  
    Line 12, "claim 13," should read --claim 15,--.

Signed and Sealed this

Second Day of August, 1994

Attest:

BRUCE LEHMAN

*Attesting Officer*      *Commissioner of Patents and Trademarks*